US009130976B1

(12) United States Patent
McCabe et al.

(10) Patent No.: US 9,130,976 B1
(45) Date of Patent: *Sep. 8, 2015

(54) TECHNIQUES FOR IDENTIFYING SOURCES OF UNAUTHORIZED CODE

(71) Applicant: Amazon Technologies, Inc., Reno, NV (US)

(72) Inventors: Karl Andre McCabe, Dublin (IR); Jon Arron McClintock, Seattle, WA (US); David James Roy Erdmann, Edmonds, WA (US)

(73) Assignee: Amazon Technologies, INC., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/084,287

(22) Filed: Nov. 19, 2013

Related U.S. Application Data

(63) Continuation of application No. 12/855,551, filed on Aug. 12, 2010, now Pat. No. 8,595,843.

(51) Int. Cl.
| | |
|---|---|
| *G06F 15/16* | (2006.01) |
| *H04L 29/06* | (2006.01) |
| *G06F 12/14* | (2006.01) |
| *G06F 11/00* | (2006.01) |
| *G06F 12/16* | (2006.01) |
| *G08B 23/00* | (2006.01) |

(52) U.S. Cl.
CPC .................................... *H04L 63/14* (2013.01)

(58) Field of Classification Search
None
See application file for complete search history.

(56) References Cited

U.S. PATENT DOCUMENTS

| 8,185,956 B1* | 5/2012 | Bogorad et al. ............... 726/25 |
| 8,595,843 B1 | 11/2013 | McCabe et al. |
| 8,707,435 B2* | 4/2014 | Garcia Morchon et al. .... 726/23 |
| 2008/0010368 A1* | 1/2008 | Hubbard et al. .............. 709/223 |

OTHER PUBLICATIONS

U.S. Appl. No. 12/855,551, "Non-Final Office Action", Mar. 13, 2013, 15 pages.
U.S. Appl. No. 12/855,551, "Notice of Allowance", Jul. 23, 2013, 6 pages.

* cited by examiner

*Primary Examiner* — Shin-Hon Chen
(74) *Attorney, Agent, or Firm* — Kilpatrick Townsend & Stockton LLP

(57) ABSTRACT

Techniques described and suggested herein include systems and methods for identifying potential sources of infections of devices by unauthorized code. In an embodiment, network traffic is logged. A plurality of computing devices that include unauthorized code is identified. The logged traffic is used to identify information sources accessed by the identified affected devices. The identified information sources may be refined. Refinement of the identified information sources may include excluding information sources that have been accessed by uninfected devices. A user interface that allows a user to further refine the identified information sources may be provided.

19 Claims, 7 Drawing Sheets

TECHNIQUES FOR IDENTIFYING SOURCES OF UNAUTHORIZED CODE

CROSS-REFERENCE TO RELATED APPLICATIONS

This application is a continuation of prior U.S. application Ser. No. 12/855,551, filed on Aug. 12, 2010, titled "TECHNIQUES FOR IDENTIFYING SOURCES OF UNAUTHORIZED CODE," and issued as U.S. Pat. No. 8,595,843 as of Nov. 26, 2013, the contents of which is hereby incorporated in its entirety by reference.

BACKGROUND

Corporations and other organizations often employ computer networks in order to facilitate their operations. Many employees are provided computers that facilitate in the performance of their duties. An employee's computer, for example, may be used to access various systems internal to the organization, including applications and databases to which public access is restricted. While internal computer networks can provide a robust set of tools for an organization, typically access to external computer networks, such as the Internet, is desirable. Many third party services provided to organizations are offered through websites and often employees need access to the Internet for general research, for purchasing goods and/or services for the organization, and for other reasons. As a result, organizations' internal networks often provide access to the Internet in order to provide employees important tools for performing their roles within the organization. The Internet, however, is a vast and dynamically changing resource that presents numerous security challenges for an organization. Accessing certain websites, for instance, may create a risk that the website will cause malicious software to be installed on the computer used to access the website. Such malicious software may be used to cause affected computers to participate in activity harmful to the organization and/or to others, such as denial-of-service attacks, dispatch of unsolicited bulk electronic mail messages (often referred to as "spam"), unauthorized access of the organization's confidential information, and other activities that, at the very least, cause additional load on the organization's resources.

In order to effectively respond to the threat of malicious software, it is often important to identify the source of the malicious software. Identifying the source of malicious software can facilitate various techniques for preventing malicious software's harmful effects. Such techniques may include modification of anti-virus software, blocking communication with identified sources of malicious software, and the like. Because the effects of malicious software can quickly cause significant damage to an organization, quick and effective identification of malicious software sources can enable an organization to maintain functionality of its systems to reduce the risk of significant harm.

DETAILED DESCRIPTION

Various techniques described and suggested herein include systems and methods for identifying the source of unauthorized software affecting an organizational network. Techniques described herein may be used, for instance, in order to identify information sources from which viruses, malware, or other unauthorized software affecting user computers of an organization have been obtained. Information sources may be websites or generally any source from which harmful software may be obtained over a communications network. Examples of information sources other than websites include file transfer protocol (FTP) sites, network locations from which applications executing on client devices obtain information, and generally any source of information that may be accessed over a network. In one embodiment, traffic over an organization's network is logged and monitored. Activity in connection with unauthorized software is detected. Detection of activity in connection with unauthorized software agents may be accomplished through various ways such as by detecting abnormal network activity or by detecting communication with information sources, such as websites, known to be associated with unauthorized software.

In an embodiment, devices involved in the detected network activity are identified. The identified devices may be devices from which a portion of the network traffic originated and/or to which network traffic was directed. The devices may be personal computers, notebook computers, personal digital assistants, mobile communication devices, tablet computers, electronic book readers, or generally any computing devices that utilize an organization's network in order to communicate with sources external to the organization. In an embodiment, information sources accessed by the identified devices are identified. For instance, websites accessed by the identified devices may be identified. A set of one or more information sources accessed by all of the identified devices, or a particular subset of the devices, is determined as a set of potentially harmful information sources. This set of information sources may be reduced in size by identifying sites visited by uninfected devices and removing those sites from the identified set.

In another embodiment, an interface for an administrative forensic tool is provided. The interface provides the user information identifying the information sources accessed by infected devices and the information sources accessed by uninfected devices. The user may use the interface in order to direct analysis of the identified websites. The user input, for instance, may direct analysis according to one or more set operations specified by the user through his or her input. Results of the analysis may be provided to the user through the interface.

Figure 1:
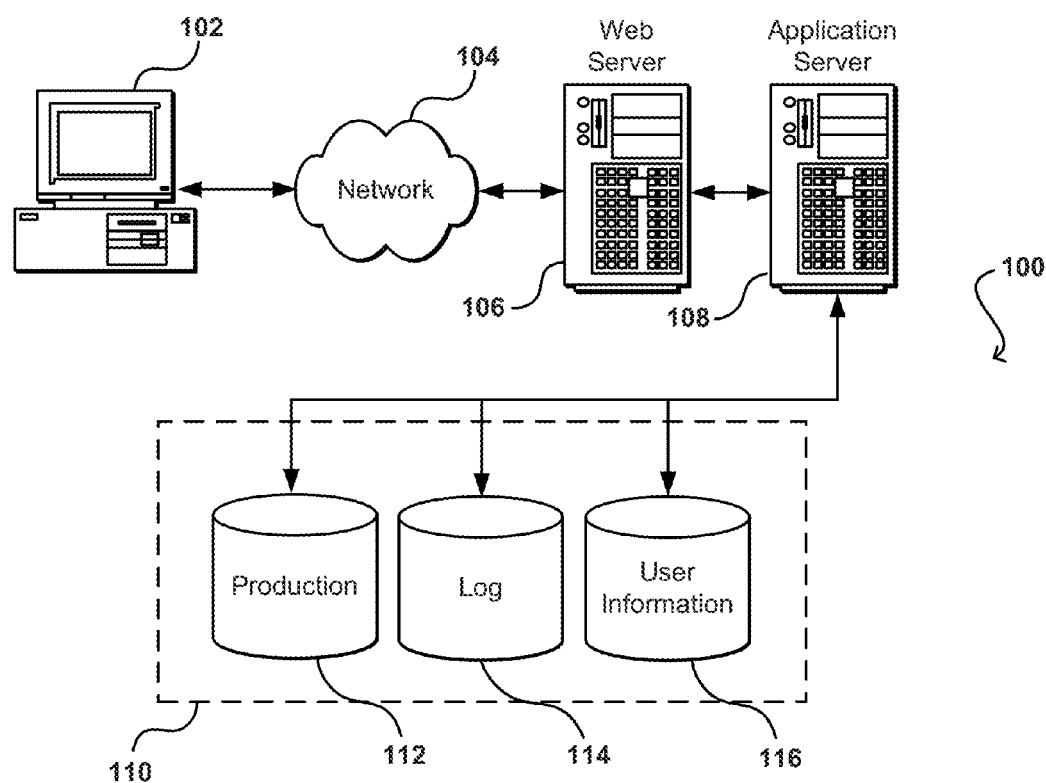
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
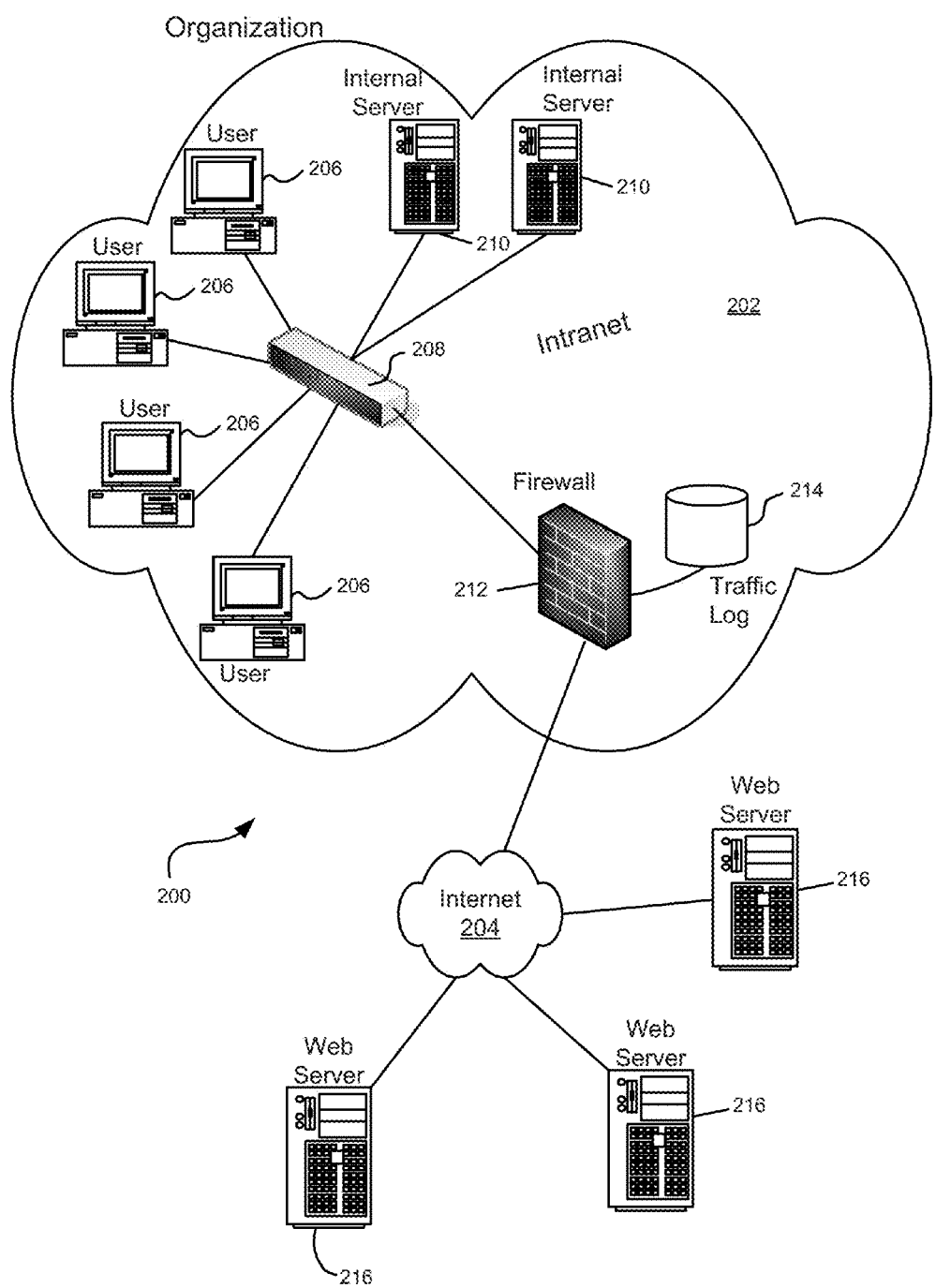
FIG. 2 illustrates an environment in which various embodiments can be implemented and which may include components in common with the environment shown in FIG. 1.

FIG. 2 shows an environment 200 which may utilize various components of the environment discussed above in connection with FIG. 1. The environment 200 includes an internal network (intranet) 202 communicatively connected to the Internet 204. The intranet may comprise a network of computer devices utilized by an organization that during the course of its operations. The intranet 202, in an embodiment, includes a plurality of user devices 206 which may be similar to the electronic client device 102 described above in connection with FIG. 1.

In the example shown in FIG. 2, the user devices 206 are connected to a switch 208 which enables the user devices to send to and receive information from various components of the intranet 202. For instance, an organization may include a plurality of internal servers 210 which perform various functions in support of the organization's activities. Internal servers 210 may be used to execute applications related to customer relationship management, human resources, accounting, electronic mail, and generally any applications utilized by the organization.

In an embodiment, the intranet 202 includes a firewall 212. In an embodiment, the firewall 212 is a device in the intranet 202 in which traffic between the intranet 202 and external sources passes. As used herein, traffic refers to communications from or communications directed to devices in the intranet 202. Examples of traffic include hypertext transfer protocol (HTTP) requests, HTTP responses, file transfer protocol (FTP) communications, electronic mail communications, short message service (SMS) messages, and generally any information communicated from one device to another according to any protocol utilized for communication. The firewall 212 may apply a set of criteria to traffic and may prevent, according to the criteria, communications from passing into the intranet 202 from outside the intranet 202 and/or communications from devices inside the intranet 202 to the devices outside the intranet 202. As an example, an FTP communication originating from the Internet 204 may be blocked by the firewall 212 unless the communication is directed to a device of the intranet 202 specifically allowed to receive such communications. In this manner, unauthorized access of file stores and data stores of the intranet 202 is prevented. Generally, the firewall 212 may provide any set of criteria in order to prevent the passage of certain communications in and/or out of an organization's network. The criteria for allowing or preventing communications by the firewall may vary widely depending on various factors, such as the security needs of the organization, the network topology, and other factors.

In an embodiment, communications allowed by the firewall may pass between one or more web servers 216 of the Internet and one or more of the users 206 at the organization. A web server 216, for example, may be used in connection with providing a website, the content of which was requested by a user 206.

In an embodiment, the firewall 212 logs communications passing through the firewall in a traffic log 214, which embodiment includes a data store for logging traffic in and out of the organization's network. Thus, if a user 206 sends a request for a website content through one of the web servers 216, that request, in an embodiment, is logged in the traffic log 214 by the firewall 212. Logging the request may involve logging various pieces of information such as information that identifies the particular user device 206 that made the request, an Internet protocol (IP) address utilized by the web server 216, and other information such as the request itself and/or any information included in the request.

The information identifying a user device 206 may be a media access control (MAC) address assigned to a network adaptor or a network interface card of the user device 206 that made the request. The user device 206 may also be identified by an Internet Protocol (IP) address, another network protocol identifier, or generally any suitable identifier. Likewise, information from a web server 216 sent to one of the user devices 206 may be logged by the firewall 212 in the traffic log 214. The information log may include information identifying the web server 216, information identifying the user 206, and may include other information such as the content sent to the user 206 or a portion thereof such as the title as indicated from a hypertext markup load (html) document sent through the user 206.

Figure 3:
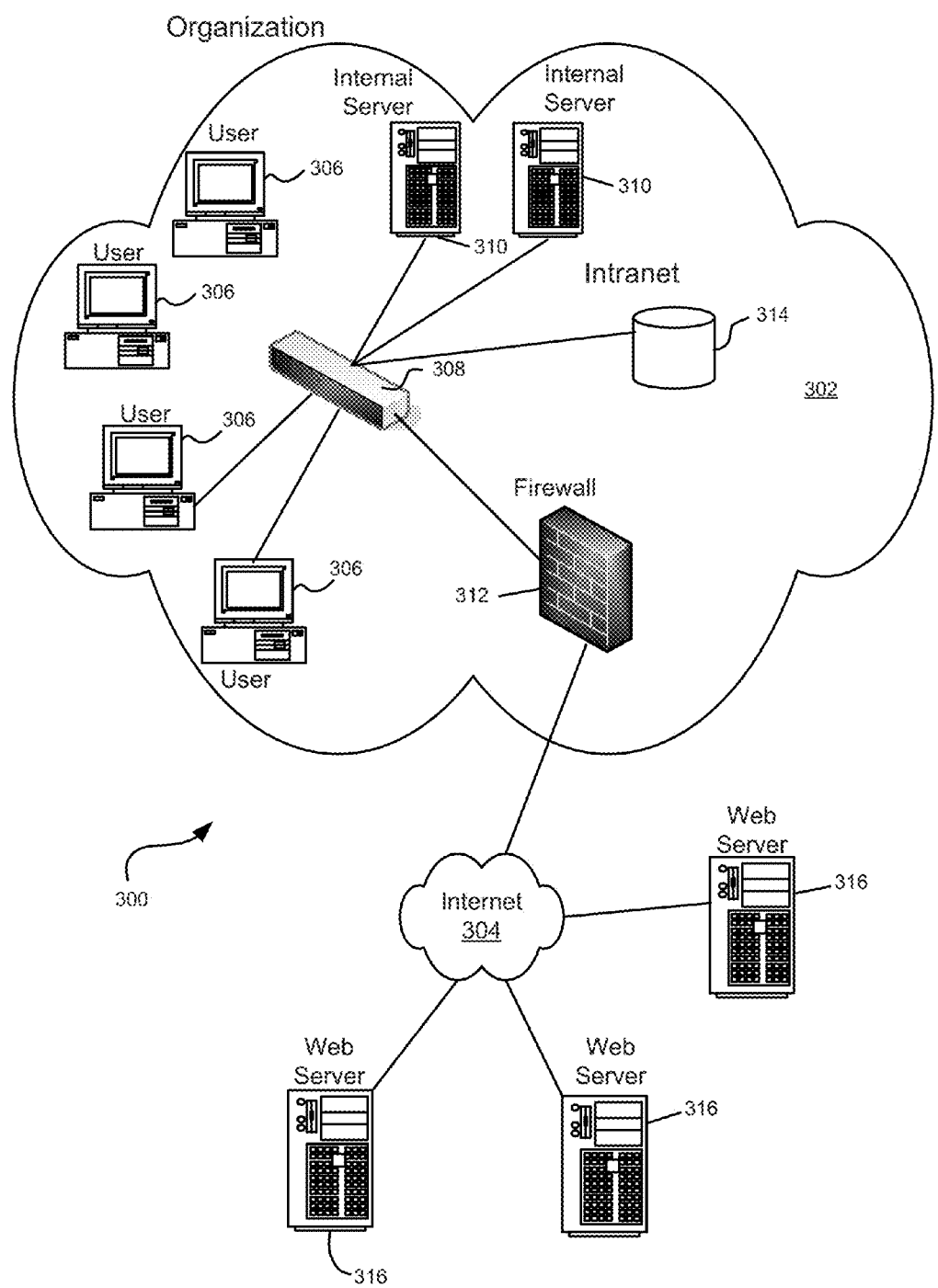
FIG. 3 illustrates another environment in which various embodiments can be implemented and which may include components in common with the environment shown in FIG. 1.

FIG. 3 shows an environment 300 that includes an alternate example of an environment 300 which may be utilized in accordance with various embodiments. The environment 300 may include an intranet 302 connected with the Internet 304 in a manner similar to that described above. In addition, the environment 300 may include user devices 306, a switch 308, an internal server 310, and a firewall 312 which may operate similar to their similarly named counterparts described above in connection with FIG. 2.

In this embodiment illustrated in FIG. 3, however, a software for logging network traffic executes on one or more of the user devices 306. The software executing on the user devices 306 may send information through the switch 308 directly to the traffic log 314. The information from a user device may be sent periodically, sent every time a communication is sent or received by a user device, or in any other suitable manner. Information sent to and stored in the traffic log 314 may be similar to information described above.

It should be noted that FIGS. 2 and 3 are provided for the purpose of illustration and, generally, organizational networks can vary widely in many different aspects, such as the number of devices, the types of devices, the particular network topology, and the like. For example, depending on the size of a network, an organization may employ multiple switches and multiple firewalls and may have a number of servers and/or other devices different from that which is shown in the drawings. Numerous traffic logs may be used and data in multiple traffic logs may be combined into a central repository. Traffic logs may also be connected with other devices other than firewalls and switches, such as any device in a network operable to provide data to the traffic logs. A traffic log may also be a separate device through which inbound communications (communications from outside of an organization's internal network) and outbound communications (communications directed toward a device outside of an organization's internal network) pass. Organizations' internal networks may include devices which are not shown in the drawings which can be used for various purposes for managing their networks. In addition to the above, organizations often have portions of their internal network in separate geographic locations. Thus, traffic within an organization's internal network may pass through the Internet or other communications networks.

The amount of traffic passing through an organization's network can be quite large, especially if the employees utilize the Internet to a significant extent in their activities. In addition, certain information regarding traffic flowing in and out of a network may not be particularly useful for identification of sources of unauthorized software. Thus, in order to reduce the amount of data logs about network activities and therefore reduce the amount of processing on that information necessary in order to perform various embodiments of the present disclosure, FIG. 4 shows a diagrammatic representation of a process for logging network traffic that may be employed in accordance with various embodiments.

Figure 4:
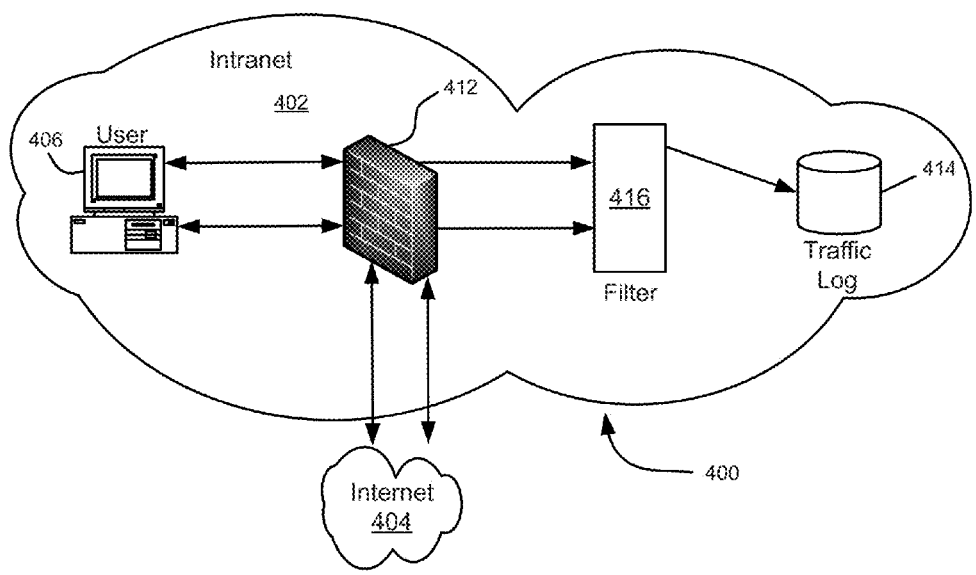
FIG. 4 shows a diagrammatic representation of a process for logging network traffic, in accordance with an embodiment.

In particular, FIG. 4 shows a sample environment 400 which includes components of a network such as those described above and which shows representation of information flow among the components. As shown, the environment 400 includes an intranet 402 connected with the Internet 404, such as in the manner described above. In addition, environment 400, as shown, includes a user device 406, a firewall 412, and a traffic log 414, which may operate similar to the traffic logs described above. In the embodiment shown in FIG. 4, the user device 406 sends communications through the firewall 412 to a device outside of the organization via the Internet 404. A communication sent by the user device 406 to the firewall 412 may be, for instance, a hypertext transfer protocol (HTTP) request that includes the user device's IP address to the firewall 412. For an outbound communication, unless criteria utilized by the firewall 412 prevent the communication from proceeding, the firewall 412 opens a socket with a web server on the Internet 404, where the socket includes a combination of an IP address of the firewall 412 and a port with which the web servers may communicate. Concurrently, in an embodiment, the firewall 412 maps the open socket to the IP address of the user device 406 that originated the HTTP request. When the web server sends an HTTP response to the IP address of the firewall 412, the firewall 412 can utilize the mapping of the open socket to the user device's IP address to relay the HTTP response to the user device 406.

In an embodiment, when the user device 406 sends an http request to the firewall 412, the firewall may also relay that request, or information derived therefrom, to a filter between the firewall source filter 416 between the firewall 412 and the traffic log 414. The filter, in an embodiment, is a device that applies one or more criteria to received communications to determine which communications to store in the traffic log 414. In an embodiment, the filter 416 maintains a set of information sources (such as a list of domain names) considered to be safe. For example, the filter 416 may maintain a list of websites that have been determined to present little or no risk of causing unauthorized software to be delivered to one or more devices of an organization's internal network. Examples of information sources that may be considered to be safe may include websites operated by large corporations, websites that have been evaluated by one or more people and identified as safe, and generally, any information source that, through some process, has been identified as safe or posing little risk.

When information from the firewall 412 to the filter 416 is associated with an information source identified as safe, the filter may take one or more actions that are different than would be taken if the information was associated with an information source not identified as safe, such as an information source whose risk of providing unauthorized software is unknown. For instance, information from the firewall 412 associated with an information source identified as safe may be received by the filter 416 and, because the information is associated with an information source identified as safe, the filter 416 may not store any of the information in the traffic log 414. Alternatively, the filter 416 may store in the traffic log 404 less of the information received from the firewall 412 for information sources identified as safe than the filter 416 would store for information sources not identified as safe. In this manner, all traffic is logged, but more information is stored for information sources that have not been identified as safe. Information stored in the traffic log 414 may be similar to that described above. In this manner, the amount of information stored in the traffic log 414 is less than it would be if simply all network traffic was treated equally when stored in the traffic log 414.

In an alternate embodiment, all traffic is recorded in the traffic log. One or more software agents may analyze data in the traffic log and delete data according to one or more criteria. For example, such a software agent may delete communications with information sources that have been identified as safe, that have been stored for a period of time, sites that are identified as being popular, and generally any suitable criteria. Software agents may also execute in addition to one or more filters.

As discussed above, FIG. 4 shows an illustrative example of a particular configuration. However, alternate configurations are also contemplated as being within the scope of the present disclosure. For instance, the firewall 412, filter 416, and traffic log 414 may be implemented together as a single device, or two devices, or more than three devices. In addition, functions performed by the filter 416 and traffic log 414 may be performed by any suitable network device. Also, a filter and/or traffic log may receive information from other devices alternative to, or in addition to, a firewall.

Figure 5:
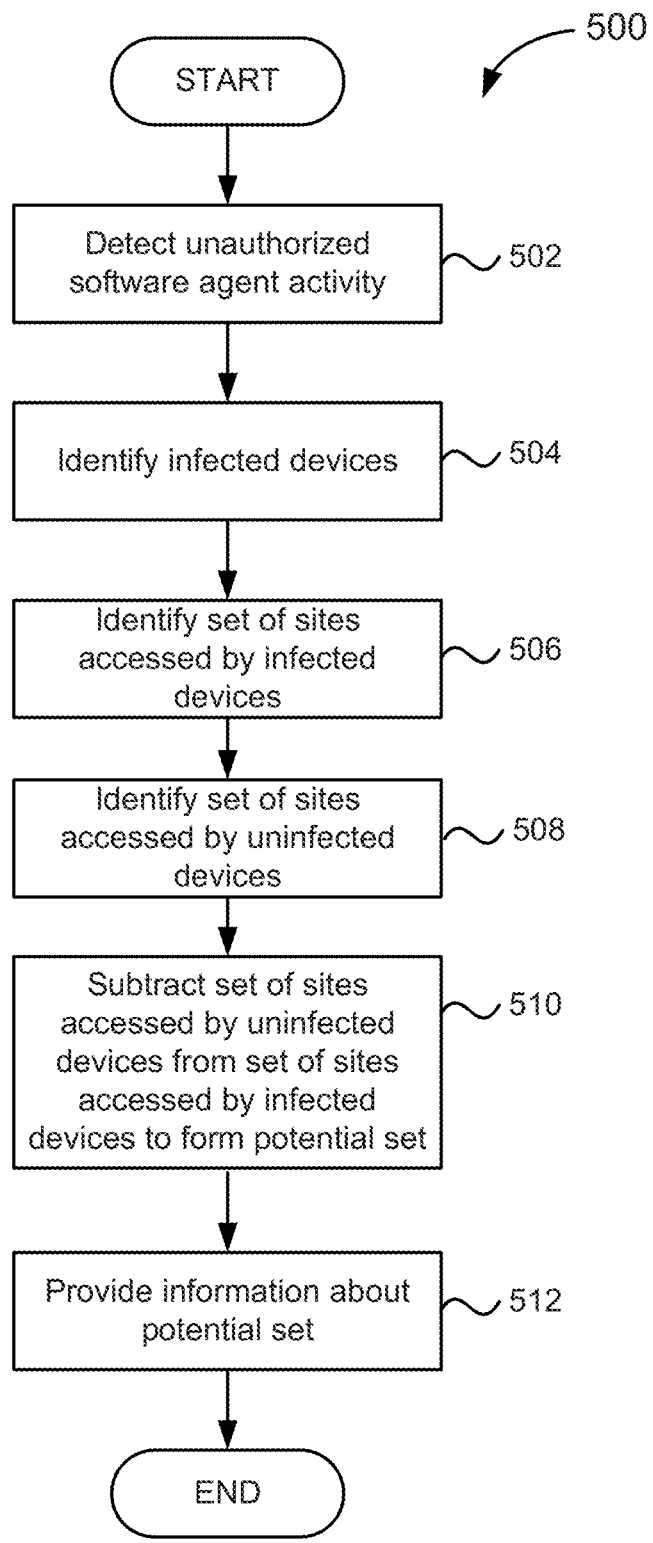
FIG. 5 shows a flowchart for a process of identifying sources of unauthorized software in accordance with an embodiment.

As noted above, information stored in one or more traffic logs may be used in order to identify sources of unauthorized software. Accordingly, FIG. 5 shows a flowchart of a process 500 which may be used to identify potential sources of unauthorized software in accordance with various embodiments and which may incorporate with the components of the various embodiments described above and the remaining figures. The process 500, and any process described herein, or variation thereof, may be performed under the control of one or more computer systems configured with executable instructions. Executable instructions may be collectively stored on one or more computer-readable storage media. In an embodiment, an organization's network traffic is monitored and unauthorized software agent activity is detected 502. As described above, detection of unauthorized software agent activity can be detected in numerous ways. In one embodiment, a list of IP addresses associated with unauthorized software agents is maintained and traffic directed to any of the IP addresses in the list is detected. The IP addresses on the list may be addresses to which unauthorized software agents cause infected devices to send communications. The list may have been created by one or more third parties that record IP addresses with which known unauthorized software agents generally cause infected devices to communicate. In this embodiment, when communications from an organization's network are directed toward an IP address on the list, a device in the network may store a record of the communication in a manner indicating that such a communication was detected. An electronic message or event may be generated and sent to an appropriate device, such as an administrator device of a network administrator having responsibility for ensuring network security or to a device executing an application used in connection with securing the network.

As another example of detection of unauthorized software agent activity, network statistics may be maintained and activity may be detected when it deviates from an established norm. For example, an organization's network activity (the number of communications traveling through the network) may be very light during nighttime hours when employees are at home. Thus, an increase in network activity outside of normal operating hours may signify the presence of one or more unauthorized software agents that may be utilizing the network for nefarious purposes, such as the dispatch of bulk electronic messages, the transmittal of sensitive data, attacks on the network or another network related to overloading network resources, and the like. As another example, an abnormal amount of traffic directed to addresses associated with particular geographic locations may be detected. Yet another example includes detecting abnormal amounts of a particular type of network traffic, such as electronic mail messages, or abnormal characteristics of a particular type of network traffic, such as electronic mail messages directed to multiple recipients. Techniques for detecting unauthorized software agent activity may be combined and generally any process for detecting unauthorized software agent activity may be used.

When unauthorized software agent activity is detected, infected devices are identified 504. Identification of the infected devices may be performed in any suitable manner. In an embodiment, a traffic log stores information related to network traffic that identifies the originators of communications and one or more other characteristics of the communications, such as addresses to which communications are directed, the types of communications, the time of communications, and the like. Depending on the manner in which the unauthorized software agent activity was detected, the information in the information log is used to determine which devices were involved in the detected activity. For instance, if detection of the activity was detected due to communications to one or more IP addresses associated with unauthorized software, the log may be referenced to determine which devices sent communication to the one or more addresses. If an abnormal amount of traffic for a particular time period is detected, the traffic log may be referenced to determine the devices from which communications originated during the time period. Generally, if any characteristics are used to detect the network activity, those characteristics may be used to analyze the traffic log to identify devices associated with the detected activity.

Figure 6:
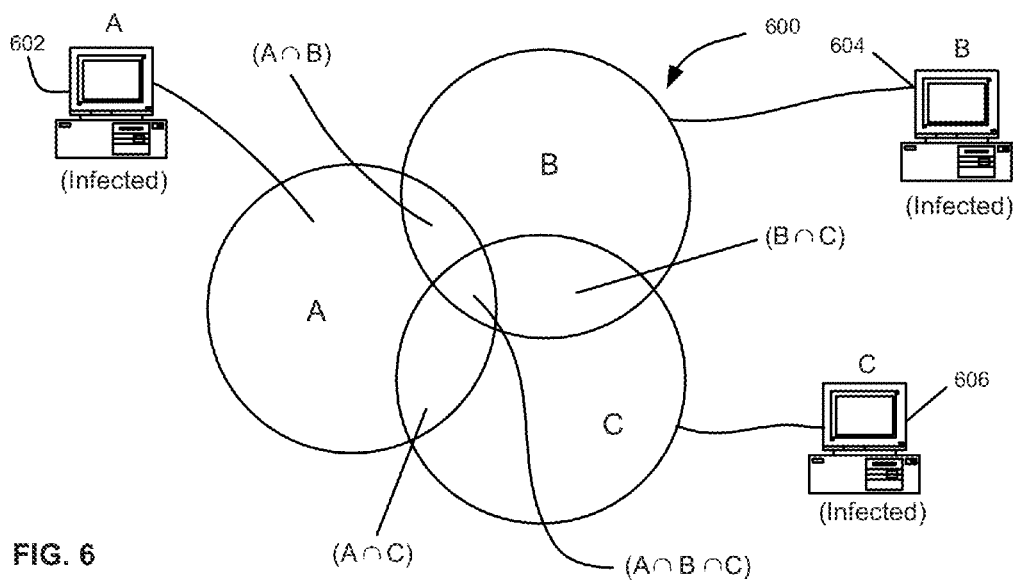
FIG. 6 shows an illustrative figure demonstrating identification of the information sources accessed by a network computer in accordance with an embodiment.

In an embodiment, when the infected devices are identified, a set of websites accessed by infected devices is identified at 506. In an embodiment, identifying the set of sites accessed by the infected devices is performed by identifying sites from which each of the infected devices has received information. Thus, if one of the infected devices accessed a particular website but another infected device did not access the particular website, the particular website, in an embodiment, may not be identified. If, however, all of the infected devices accessed a particular website, then the particular website, in an embodiment, may be identified. An illustrative example of identifying the websites accessed by infected devices is shown in FIG. 6. While, for the purpose of illustration, the present disclosure discusses identifying all sites commonly accessed by each of the infected devices, variations are possible. For example, all sites commonly accessed by each of a subset of the infected devices may be identified and/or less than all commonly accessed sites may be identified based at least in part on one or more criteria.

In an embodiment, sites accessed by the uninfected devices are identified 508. Identification of the sites accessed by uninfected devices may include identifying each site accessed by an uninfected device, for a plurality of uninfected devices, for a period of time. For example, if an uninfected device has accessed several sites, those sites, in an embodiment, are identified. If another uninfected device has accessed other sites, those sites, in an embodiment, are identified. In this manner, sites that are unlikely to have caused infection of unauthorized software are identified. It should be noted that, for the purpose of illustration, the present disclosure discusses identification of all sites accessed by any of the uninfected devices, but variations are possible. For example, all sites accessed by a plurality of uninfected devices may be identified, or all sites accessed by a threshold number of devices may be identified. Generally, any manner of identifying one or more sites accessed by one or more uninfected devices may be utilized. Further, while identification of a set of sites accessed by infected devices is shown in the figure as occurring before identification of the set of sites accessed by uninfected devices, such actions do not need to be performed in this order and, generally, several actions of the process 500 may be performed differently than shown and/or described.

Figure 7:
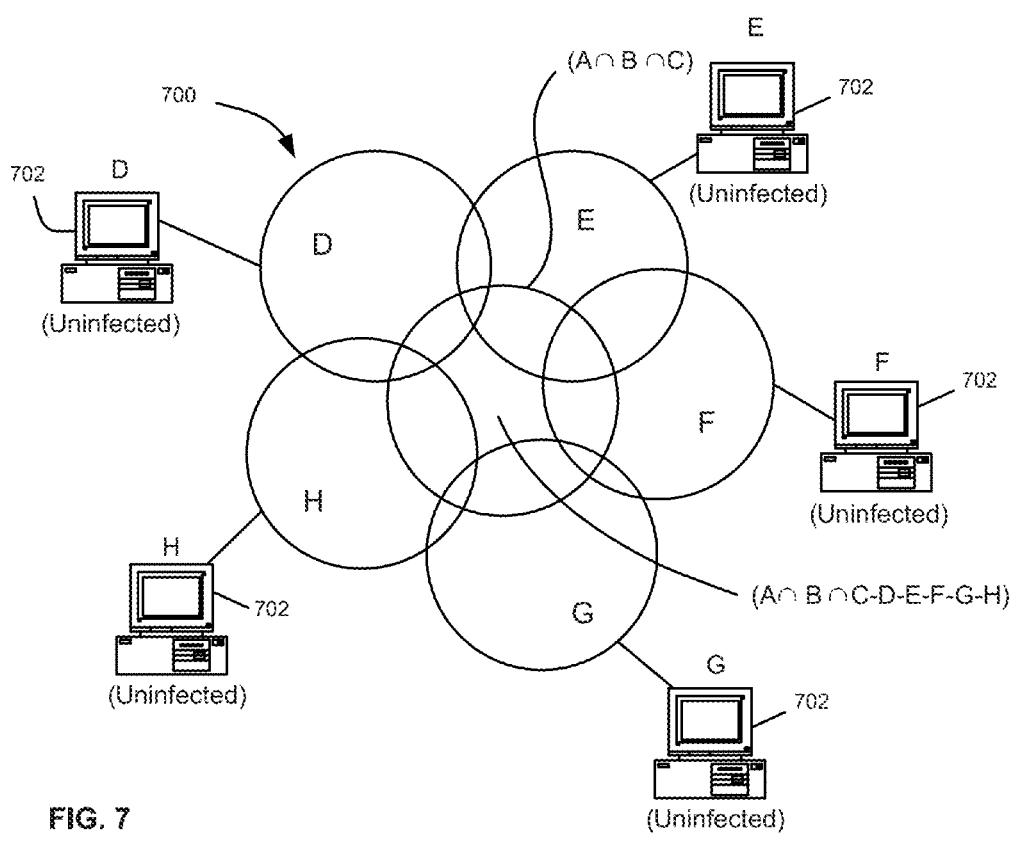
FIG. 7 shows a diagrammatic representation of refining results found in connection with the process described in connection with FIG. 6.

With a set of sites accessed by infected devices and a set of sites accessed by uninfected devices, in an embodiment, the set of sites accessed by uninfected devices (or at least a portion thereof) is subtracted 510 from the set of sites accessed by infected devices to form a potential set of sites. In this manner, in an embodiment, the potential set of sites includes sites accessed by each of a plurality of infected devices, but excludes sites that have been accessed by uninfected devices and, therefore, are less likely to have caused an infection of unauthorized software. An illustrative example of subtracting sites accessed by uninfected devices is shown in FIG. 7.

In an embodiment, information about the potential set in the embodiment is provided to a user 512 in order to enable the user to perform forensic analysis in connection with the identified infected sites. A list of domain names in the potential set of sites, for example, may be provided to the user on an interface of an application that allows the user to view the domain names in the list, investigate potential sources of unauthorized software, manipulate the operations that resulted in the potential set of sites to form a new set of potential sites, and the like. An illustrative example is provided in FIG. 8 which shows an interface 800 of an administrative detection application that enables an administrator to view analysis, such as the analysis described above and possibly a modified analysis in order to identify sources of unauthorized software agent.

As noted above, FIG. 6 illustrates a diagrammatic representation 600 of an illustrative process for identifying potential sources of unauthorized software agents. As shown in the representation 600, a plurality of user devices has been identified as being infected by an unauthorized software agent. For example, in this particular example, three devices 602 are shown, although there may be more or fewer. In the representation 600, the infected devices 602 have accessed a set of websites identified in the figure as sets A, B, and C. While the description of FIGS. 6 and 7 discuss websites for the purpose of illustration, other information sources other than websites may be applicable.

In an embodiment, the intersection of sets A, B, and C is calculated to determine a set of websites accessed by each of the infected devices. In the intersection of sets A, B, and C, each of the infected devices 602 has visited each of the websites. Thus, in this example, sites accessed by two of the infected devices, but not the third, are not in the intersection. Similarly, sites accessed by one of the infected devices, but not the other two are not in the intersection. Sites accessed by all three of the infected devices, however, are in the intersection.

While the intersection of the set of sites provides a good starting point for discovering sources of unauthorized software, further refinements may be made in order to reduce the number of sites to be investigated. Generally, it is possible to remove from the intersection sites that are less likely to have caused an infection of unauthorized software. For instance, certain websites may be popular in an organization or among the public in general. Many of such websites may have been accessed by all of the infected devices simply because the websites are popular and not because of any relationship to unauthorized software. Accordingly, FIG. 7 shows a diagrammatic representation 700 of an illustrative example of how the set of potential sources of potential software may be reduced. In this example, a plurality of uninfected devices 702 has been identified and websites accessed by the uninfected devices are subtracted from the intersections of the sets of sites visited by the infected devices. Specifically, each of the uninfected devices 702, as shown in the drawings, has accessed a corresponding set of websites identified in the drawing as sets D, E, F, G, and H. For example, looking to the uninfected device 702 that accessed the set D, set D may contain a website that is quite popular and generally is known to users of the Internet and which may have been accessed by each of the infected devices described above with respect to FIG. 5. This website may be in a set of sites that was accessed by all the infected devices. Thus, by subtracting this popular website, which may be unlikely to have caused harm a website is removed from the set of sites that should be investigated. Therefore, after subtracting the sets of sites visited by the uninfected devices, the remaining set comprises of a set of websites accessed by the infected devices, but not accessed by any identified uninfected device. Such websites in the remaining set are generally more likely to have resulted in the unauthorized software agent and therefore investigation of the sites in the remaining set is more efficient and more effective.

As discussed above, results of the above analysis, or variations thereof, may be provided to a user through an interface. An illustrative example of such an interface is provided in FIG. 8. In the example shown, the interface 800 includes a plurality of panes including, from the left, a first pane 802, second pane 804, third pane 806, and fourth pane 808. In an embodiment, the first pane 802 provides a list of domain names visited by devices that have not been identified as infected. As shown, a user may select one or more of the domain names by checking a checkbox interface element associated with each of the domain names in order to exclude those domain names from appearing in a list of potential sources of infection. As a default, all domain names may be selected for the user. While the first pane 802 shows top-level domain names, items in the first pane (or in other suitable panes) may include complete or partial uniform resource locators (URLs), titles of web pages, IP addresses, and/or, generally, any useful information. Further, information may be provided in the first pane hierarchically. For instance, a top-level domain may be shown with all websites from the top-level domain. A user may be able to collapse such a display to show only the top-level domain, or may expand a top-level domain in order to see and/or select specific pages and/or portions of a website associated with a top level domain.

The second pane 804, in an embodiment, includes a list of devices that have been identified as infected. The infected devices may be labeled according to unique identifiers associated with each device, by users assigned to the devices, or in any suitable manner. A user may select a set of the infected devices and, in an embodiment, sites accessed by each of the infected devices will be identified as potential sources of infection, excluding sites that were also visited by one or more of the sites selected in the first pane 802. In this manner, a user may vary the set of devices that are used in the analysis.

The third pane 806, in an embodiment, includes a list of sites accessed by each of the devices selected in the second pane 804. The contents of the third pane 806 may dynamically change as a user selects and deselects devices from the second pane 804. As with the sites in the first pane 802, a user may select one or more sites in the third pane 806 and the selected sites that have not also been selected in the first pane 802, in an embodiment, will be included in sites identified as potential sources of infection. In an embodiment, all sites in the third pane 806 are selected by default and a user may de-select sites by unchecking corresponding checkbox interface elements. In this manner, for example, a user may deselect sites that he or she knows are unlikely to have caused infection, such as popular electronic commerce websites.

The fourth pane 808, in an embodiment, shows a list of potential sources of infection by unauthorized software. In an embodiment, the sites listed in the fourth pane 808 comprise sites selected in the third pane 806 but exclude sites selected in the first pane 802. The list provided in the fourth pane 808, in an embodiment, is calculated each time the user changes a selection in one of the first, second, or third panes. In this manner, the user can see how his or her selections affect the results and can adjust his or her input accordingly. In an embodiment, sites listed in the fourth pane are selectable in order to cause presentation to the user of information about the selected sites. Information provided may include the sites content, WHOIS information, and the like. In an embodiment, interface controls are provided in the fourth pane 808 in order to allow the user to hide sites listed in the pane.

Figure 8:
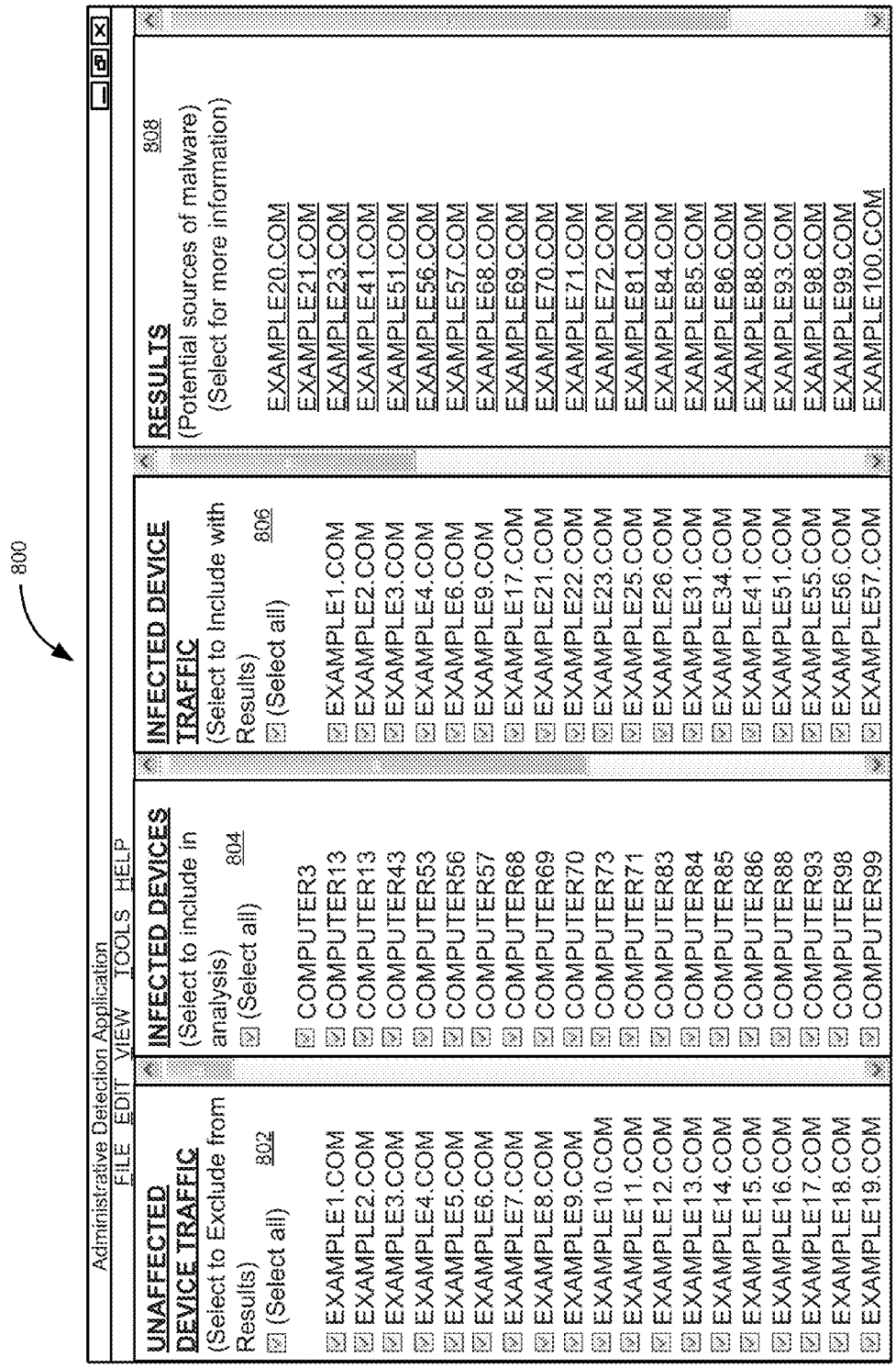
FIG. 8 shows an illustrative example of an administrative interface of a forensic application for identifying harmful information sources in accordance with the embodiment.

While FIG. 8 provides an illustrative example of an interface in accordance with an embodiment, interfaces that utilize various embodiments of the present disclosure may vary widely. For instance, various features may be provided in addition to those described above in order to provide even greater functionality. Also, while the above description discusses exclusion or inclusion of sites in results based on user selection, selection may cause the opposite of that described above. For instance, a user may select sites in the first pane 802 in order to include corresponding sites in the results instead of excluding them from the results. Likewise, users may select sites in the third pane 806 in order to exclude those sites from the results instead of including the selected sites. In addition, the arrangement of panes is provided for the purpose of illustration, and other arrangements are possible, and additional panes not shown are contemplated as being within the scope of the present disclosure. For instance, a pane dedicated to unaffected devices that is similar to the second pane 804 may be provided in order to allow a user to control which sites appear in the first pane 802. As another example of possible variations, sorting capabilities may be provided to the user in order to allow the user to sort the information listed in each pane according to some criteria, such as alphabetical, traffic volume associated with sites, and the like.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments are described herein, including the best mode known to the inventors for carrying out various embodiments. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

For the Examiner's convenience, Applicants note that this application is a continuation of U.S. Pat. No. 8,595,843. The claims of the present application are different and possibly, at least in some aspects, broader in scope than the claims pursued in the parent application. To the extent any prior amendments or characterizations of the scope of any claim of the parent or any cited documents could be construed as a disclaimer of any subject matter supported by the present disclosure, Applicants hereby rescind and retract such disclaimer. Accordingly, the references previously presented in the parent applications may need to be revisited.

What is claimed is:

1. A computer-implemented method, comprising:
under the control of one or more computer systems configured with executable instructions,
identifying information sources accessed by computing devices, the information sources associated with one or more computing devices used to access the information sources, the identifying comprising:
monitoring communications that pass through a firewall associated with the one or more computer systems; and
determining the information sources included with the communications that pass through the firewall;
identifying a subset of the computing devices including unauthorized code;
identifying, based at least in part on the identified information sources, a set of information sources accessed by individual ones of a plurality of the subset of computing devices;
determining one or more information sources accessed by computing devices not included in the subset of computing devices, the one or more information sources corresponding to the set of information sources accessed by individual ones of the subset of computing devices, the computing devices not included in the subset of computing devices being one or more unaffected computing devices in association with the unauthorized code;
providing information identifying at least a subset of the set of information sources; and
determining a set of candidate websites by a comparison of one or more information sources accessed by the one or more unaffected computing devices with the set of information sources accessed by the individual ones of the plurality of the subset of computing devices.

2. The computer-implemented method of claim 1, wherein determining the one or more information sources includes comparing the one or more information sources accessed by the computing devices not included in the subset of computing devices with the set of information sources accessed by individual ones of the subset of computing devices.

3. The computer-implemented method of claim 1, wherein determining the set of candidate websites by the comparison includes removing the one or more information sources accessed by the one or more unaffected computing devices from the set of information sources accessed by individual ones of the plurality of the subset of computing devices, and
wherein the provided information is from the set of candidate websites.

4. The computer-implemented method of claim 1, wherein identifying the information sources accessed by the computing devices includes receiving, by a network device, information passed between a plurality of the computing devices and the information sources.

5. The computer-implemented method of claim 1, wherein identifying the subset of computing devices including unauthorized code includes:
monitoring traffic in a network;
detecting abnormal network traffic; and
determining the subset of computing devices as contributors to the abnormal network traffic.

6. The computer-implemented method of claim 5, wherein detecting abnormal network traffic includes detecting an increase in network traffic outside particular operating hours.

7. The computer-implemented method of claim 5, wherein detecting abnormal network traffic includes detecting network traffic directed to one or more addresses associated with a geographic region.

8. The computer-implemented method of claim 1, wherein determining the one or more information sources further comprises:
receiving a communication request at a firewall;
determining that the communication request is associated with one or more criteria that identifies the communication request as safe; and
preventing the communication request from being stored in a traffic log of the information sources.

9. A system in a network for identifying potential sources of unauthorized code, comprising:
one or more network devices that collectively identify, from one or more data stores, information sources accessed by computing devices in a manner associating the information sources with one or more computing devices utilized to access individual information sources; and
one or more computing systems that are collectively operable to, at least:
identify a subset of the computing devices infected with the unauthorized code, the computing devices not included in the subset of computing devices being one or more unaffected computing devices in association with the unauthorized code;
identify, based at least in part on the identified information sources, a set of information sources accessed by individual ones of a plurality of the computing devices infected by the unauthorized code, the identifying comprising:
monitoring communications that pass through a firewall associated with the one or more computer systems; and
determining the information sources included with the communications that pass through the firewall;
determine one or more information sources accessed by computing devices not included in the subset of computing devices; and
provide information identifying at least a subset of the set of information sources based at least in part on a comparison of the set of information sources accessed by the individual ones of the plurality of the computing devices infected with the unauthorized code with the one or more information sources accessed by the one or more unaffected computing devices.

10. The system of claim 9, wherein identifying the information sources includes at least one of the one or more network devices configured to log network traffic between the computing devices and the information sources.

11. The system of claim 9, wherein identifying the information sources includes the one or more network devices configured to exclude from the one or more data stores information sources identified as safe.

12. The system of claim 9, wherein the information sources comprise websites.

13. One or more computer-readable storage devices for storing computer-executable instructions that, when executed by one or more computer systems, configure the one or more computer systems to perform operations comprising:
   identifying information sources accessed by computing devices, the identifying comprising:
      monitoring communications that pass through a firewall associated with the one or more computer systems; and
      determining the information sources included with the communications that pass through the firewall;
   identifying a subset of the computing devices infected with unauthorized code, the computing devices not included in the subset of computing devices being one or more unaffected computing devices in association with unauthorized code;
   identifying, based at least in part on the identified information sources, a set of information sources accessed by individual ones of a plurality of the computing devices infected with the unauthorized code; and
   providing information identifying at least a subset of the set of information sources based at least in part on a comparison of the set of information sources accessed by individual ones of the plurality of the computing devices infected with the unauthorized code with one or more information sources accessed by the one or more unaffected computing devices.

14. The one or more computer-readable storage devices of claim 13, further including instructions that, when executed by the one or more computer systems, configure the one or more computer systems to perform operations comprising:
   determining a set of candidate websites by removing one or more information sources accessed by the one or more unaffected computing devices from the set of information sources accessed by individual ones of the subset of infected computing devices, and
   wherein the provided information is from the set of candidate websites.

15. The one or more computer-readable storage devices of claim 13, wherein identifying the information sources accessed by the computing devices of an organization includes receiving, by a network device, information passed between a plurality of the computing devices and the information sources.

16. The one or more computer-readable storage devices of claim 13, wherein identifying the information sources accessed by the computing devices of an organization includes logging content of the information sources and wherein providing information identifying at least the subset of the set of information sources includes providing logged content from the information sources of the subset.

17. The one or more computer-readable storage devices of claim 13, wherein identifying the subset of computing devices infected with unauthorized code includes:
   storing a plurality of addresses known to be associated with unauthorized code;
   detecting traffic in a network directed toward one or more of the stored addresses;
   identifying one or more computing devices that originated the detected traffic as being affected computing devices.

18. The one or more computer-readable storage devices of claim 17, wherein the plurality of address are associated with a geographic region.

19. The one or more computer-readable storage devices of claim 13, wherein identifying the subset of computing devices infected with unauthorized code includes:
   monitoring traffic in a network;
   detecting an increase in network traffic outside of particular operating hours; and
   determining the subset of computing devices as contributors to the increase in network traffic.

* * * * *